US012069652B2

(12) United States Patent
Wang et al.

(10) Patent No.: US 12,069,652 B2
(45) Date of Patent: Aug. 20, 2024

(54) METHOD TO DETERMINE SPATIAL QUASI CO-LOCATION (QCL) ASSUMPTION FOR CHANNEL STATE INFORMATION REFERENCE SIGNAL (CSI-RS) IN NEW RADIO (NR)

(71) Applicant: Apple Inc., Cupertino, CA (US)

(72) Inventors: Guotong Wang, Beijing (CN); Yushu Zhang, Beijing (CN); Alexei Davydov, Nizhny Novgorod (RU); Gang Xiong, Portland, OR (US)

(73) Assignee: Apple Inc., Cupertino, CA (US)

( * ) Notice: Subject to any disclaimer, the term of this patent is extended or adjusted under 35 U.S.C. 154(b) by 470 days.

(21) Appl. No.: 17/287,794

(22) PCT Filed: Oct. 31, 2019

(86) PCT No.: PCT/US2019/059070

§ 371 (c)(1),
(2) Date: Apr. 22, 2021

(87) PCT Pub. No.: WO2020/096852

PCT Pub. Date: May 14, 2020

(65) Prior Publication Data

US 2021/0400700 A1 Dec. 23, 2021

Related U.S. Application Data

(60) Provisional application No. 62/757,665, filed on Nov. 8, 2018.

(51) Int. Cl.

| | |
|---|---|
| ***H04W 72/1273*** | (2023.01) |
| ***H04W 72/044*** | (2023.01) |
| ***H04W 72/23*** | (2023.01) |

(52) U.S. Cl.
CPC ..... *H04W 72/1273* (2013.01); *H04W 72/046* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2019/0261338 | A1* | 8/2019 | Akkarakaran | H04B 7/0619 |
| 2020/0068457 | A1* | 2/2020 | You | H04L 1/0026 |
| 2021/0022152 | A1* | 1/2021 | Yang | H04W 72/56 |

FOREIGN PATENT DOCUMENTS

| | | | |
|---|---|---|---|
| KR | 20180034612 | A | 4/2018 |
| WO | 2018083253 | A1 | 5/2018 |
| WO | 2018196518 | A1 | 11/2018 |

OTHER PUBLICATIONS

PCT Search Report dated Apr. 8, 2020 in connection with PCT Application No. PCT/US2019/059070.

(Continued)

*Primary Examiner* — Jason E Mattis
*Assistant Examiner* — Bao G Nguyen
(74) *Attorney, Agent, or Firm* — Eschweiler & Potashnik, LLC

(57) ABSTRACT

An apparatus configured to be employed in a user equipment (UE) associated with a new radio (NR) communication system is disclosed. The apparatus comprises one or more processors configured to process a physical downlink shared channel (PDSCH) scheduling signal, received from a gNodeB associated therewith, wherein the PDSCH scheduling signal is configured to schedule a transmission of PDSCH. In some embodiments, the PDSCH scheduling signal comprises a transmission configuration indicator (TCI) state indicative of a channel state information reference signal (CSI-RS) resource that is triggered aperiodically. In some embodiments, the apparatus is further configured to (Continued)

determine a receive (Rx) beam to be utilized for the reception of the scheduled PDSCH transmission, that forms a PDSCH Rx beam, based on the indicated CSI-RS resource.

18 Claims, 5 Drawing Sheets

(56) References Cited

OTHER PUBLICATIONS

PCT Written Opinion dated Apr. 8, 2020 in connection with PCT Application No. PCT/US2019/059070.

3GPP; TSG RAN; NR; Physical layer procedures for data (Release 15), 3GPP TS 38.214 V15.3.0, Oct. 1, 2018 sections 5.1.2.3, 5.1.5, 5.2.1.5.1.

Samsung, 'Discussion on beam indication for PDSCH', R1-1717612, 3GPP TSG RAN WG1 Meeting #90bis, Prague, Czech, Oct. 2, 2017 section 4.

Lin Xingqin at al, 5G New Radio: Unveiling the Essentials of the Next Generation Wireless Access Technology; Ericsson; Dec. 6, 2019.

www.techplayon.com; "5G NR Reference Signals (DMRS, PTRS, SRS and CSI-RS)"; Article; Sep. 26, 2018; http://www.techplayon.com/5g-nr-reference-signals-dmrs-ptrssrs-and-csi-rs/.

www.sharetechnote.com; "QCL (Quasi Co Location)/TCI(Transmission Configuration Indication)"; Article; http://www.sharetechnote.com/html/5G/5G_QCL.html; Nov. 20, 2019.

Naveen Chelikani; "TCI (Transmission Configuration Indicator) States & QCL (Quasi Co-Location) of 5G NR Ref Signals."; Article; Jul. 29, 2019; https://www.linkedin.com/pulse/tci-transmission-configuration-indicator-states-qcl-quasi-chelikani/.

International Preliminary Report on Patentability dated May 11, 2021 in connection with PCT Application No. PCT/US2019/059070.

* cited by examiner

METHOD TO DETERMINE SPATIAL QUASI CO-LOCATION (QCL) ASSUMPTION FOR CHANNEL STATE INFORMATION REFERENCE SIGNAL (CSI-RS) IN NEW RADIO (NR)

CROSS-REFERENCE TO RELATED APPLICATIONS

This application is a National Phase entry application of International Patent Application No. PCT/US2019/059070 filed Oct. 31, 2019, which claims the benefit of and priority to U.S. Provisional Application No. 62/757,665, filed Nov. 8, 2018, entitled "A METHOD TO DETERMINE SPATIAL QCL ASSUMPTION FOR CSI-RS IN NR", the contents of which are herein incorporated by reference in their entirety.

FIELD

The present disclosure relates to new radio (NR) systems, and in particular, to a system and a method to determine spatial quasi co-location (QCL) assumption for channel state information reference signal (CSI-RS) in new radio (NR) systems.

BACKGROUND

5G New Radio (NR) technology supports very high data rate with lower latency compared to its predecessor LTE (4G) technology. 5G NR supports mmwave frequency band (from 24.25 GHz to 52.6 GHz). As the mmwave band uses very high frequency, it leads to propagation loss and other losses. To compensate for the losses, directional communication is essential at such frequencies. Antenna arrays with large number of antenna elements make directional communication possible due to smaller wavelengths. Directional communication provides beamforming gain to the radio frequency (RF) link budget which helps in compensation of propagation loss. Moreover, large antenna array helps to achieve higher data rate due to spatial multiplexing technique. These directional links require accurate alignment of transmitted and received beams. In order to achieve alignment of beam pair and to have required end to end performance with desired delay, beam management operations are introduced in the 5G NR. Beam management procedure is used in 5G NR in order to acquire and maintain a set of transmit/receive beams which can be used for downlink (DL) and uplink (UL) transmission/reception.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
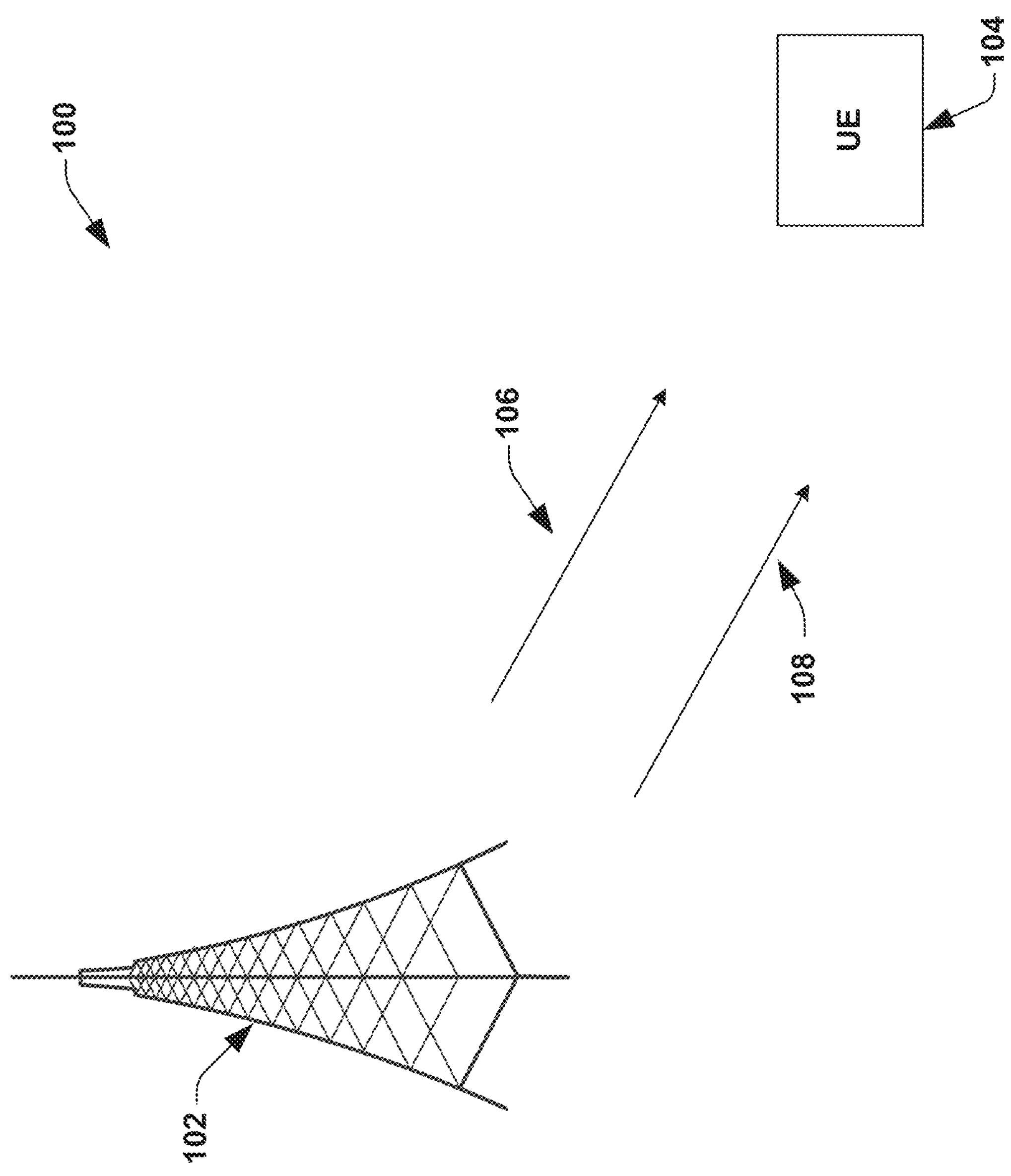
FIG. 1 illustrates a simplified block diagram of new radio (NR) system, according to one embodiment of the disclosure.

In one embodiment of the disclosure, an apparatus configured to be employed in a user equipment (UE) associated with a new radio (NR) system is disclosed. The apparatus comprises one or more processors configured to process a physical downlink shared channel (PDSCH) scheduling signal, received from a gNodeB associated therewith, wherein the PDSCH scheduling signal is configured to schedule a transmission of PDSCH. In some embodiments, the PDSCH scheduling signal comprises a transmission configuration indicator (TCI) state indicative of a channel state information reference signal (CSI-RS) resource that is triggered aperiodically. In some embodiments, the apparatus is further configured to determine a receive (Rx) beam to be utilized for the reception of the scheduled PDSCH transmission, that forms a PDSCH Rx beam, based on the indicated CSI-RS resource.

In one embodiment of the disclosure, a method for an apparatus configured to be employed in a user equipment (UE) associated with a new radio (NR) system is disclosed. The method comprises processing a physical downlink shared channel (PDSCH) scheduling signal, received from a gNodeB associated therewith, at one or more processors associated with the UE, wherein the PDSCH scheduling signal is configured to schedule a transmission of PDSCH. In some embodiments, the PDSCH scheduling signal comprises a transmission configuration indicator (TCI) state indicative of a channel state information reference signal (CSI-RS) resource that is triggered aperiodically. In some embodiments, the method further comprises determining, at the one or more processors, a receive (Rx) beam to be utilized for the reception of the scheduled PDSCH transmission, that forms a PDSCH Rx beam, based on the indicated CSI-RS resource, when a scheduling offset between the PDSCH scheduling signal and the scheduled transmission of the PDSCH is greater than or equal to a predefined PDSCH scheduling threshold.

In one embodiment of the disclosure, a computer readable storage device storing executable instructions that, in response to execution, cause one or more processors of a user equipment (UE) to perform operations is disclosed. The operations comprise processing a physical downlink shared channel (PDSCH) scheduling signal, received from a gNodeB associated therewith, wherein the PDSCH scheduling signal is configured to schedule a transmission of PDSCH. In some embodiments, the PDSCH scheduling signal comprises a transmission configuration indicator (TCI) state indicative of a channel state information reference signal (CSI-RS) resource that is triggered aperiodically. In some embodiments, the operation further comprise determining a receive (Rx) beam to be utilized for the reception of the scheduled PDSCH transmission, that forms a PDSCH Rx beam, based on the indicated CSI-RS resource, when a scheduling offset between the PDSCH scheduling signal and the scheduled transmission of the PDSCH is greater than or equal to a predefined PDSCH scheduling threshold.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, beam management procedure is used in 5G NR in order to acquire and maintain a set of transmit (Tx)/receive (Rx) beams which can be used for downlink (DL) and uplink (UL) transmission/reception. As part of the beam management procedure, in some embodiments, the gNodeB may be configured to provide beam indication or spatial relation information indicative of a receive (Rx) beam to be utilized by a user equipment (UE) for physical downlink shared channel (PDSCH) and physical downlink control channel (PDCCH) reception. For example, for PDSCH, the gNodeB may be configured to provide the spatial relation information in a transmission configuration indicator (TCI) state included within a PDSCH scheduling signal configured to schedule the PDSCH. In some embodiments, the PDSCH scheduling signal comprises a PDCCH. In some embodiments, the PDSCH scheduling signal comprises downlink control information (DCI) which includes the TCI state. The TCI state indicates one or more reference signals, such as channel state information reference signal (CSI-RS), synchronization signal block (SSB) etc. for spatial quasi co-location (QCL) relationship (i.e., to determine the UE Rx beam for PDSCH). In the TCI state, the CSI-RS could be aperiodic/periodic/semi-persistent CSI-RS.

According to the current new radio (NR) specification, if the UE is scheduled with PDSCH transmission and a scheduling offset between the PDSCH and the PDSCH scheduling signal (for example, the scheduling PDCCH) is larger than a certain threshold, the UE could apply the TCI state as indicated within the PDSCH scheduling signal for PDSCH reception. In other words, the UE may be configured to determine the UE Rx beam for the PDSCH based on the reference signal (in particular, based on a spatial QCL assumption of the reference signal) indicated within the TCI state. In some embodiments, the spatial QCL assumption of the reference signal refers to an Rx beam utilized for receiving the reference signal. Similarly, in some embodiments, the TCI state comprising one or more reference signals for spatial QCL relationship may be configured as part of a PDCCH configuration signal configured to configure the PDCCH. Therefore, in such embodiments, the UE may be configured to determine the UE Rx beam for the PDCCH reception based on the reference signal (in particular, based on a spatial QCL assumption of the reference signal) indicated within the TCI state.

In some embodiments, the reference signal indicated within the TCI state comprises a CSI-RS resource that is triggered aperiodically, i.e., an aperiodic CSI-RS. The aperiodic CSI-RS could be triggered following one trigger state for spatial QCL assumption determination. In such embodiments, it should be identified how to determine the spatial QCL assumption for the CSI-RS resource in the TCI state if it has been aperiodically triggered. Further, it should be clarified whether the UE should apply the spatial QCL assumption obtained from the aperiodic CSI-RS transmission for PDSCH reception. Therefore, a system and a method to determine spatial QCL assumption for CSI-RS, when the CSI-RS indicated within the TCI state is triggered aperiodically, is proposed in this disclosure. In particular, a UE configured to determine a PDSCH Rx beam for PDSCH reception based on a TCI state comprising an aperiodic CSI-RS resource (indicated as part of a PDSCH scheduling signal) is proposed herein. Further, a UE configured to determine a PDCCH Rx beam for PDCCH reception based on a TCI state comprising an aperiodic CSI-RS resource (indicated as part of a PDCCH configuration signal) is proposed herein.

FIG. 1 illustrates a simplified block diagram of a new radio (NR) system 100, according to one embodiment of the disclosure. In some embodiments, the NR system 100 facilitates to determine spatial quasi co-location (QCL) assumption for an aperiodic channel state information reference signal (CSI-RS) indicated as part of a transmission configuration indicator (TCI) state. The NR system 100 comprises a gNodeB 102 and a user equipment (UE) 104. In other embodiments, however, the NR system 100 can comprise a plurality of gNodeBs and UEs. In some embodiments, the gNodeB 102 is equivalent to a base station, an eNodeB in long term evolution (LTE) systems etc. In some embodiments, the UE 104 may comprise a mobile phone, a tablet computer, an internet of things (IoT) device etc. The gNodeB 102 and the UE 104 are configured to communicate with one another over a communication medium (e.g., air). In some embodiments, the gNodeB 102 and the UE 104 supports multi-beam operation. In some embodiments, the gNodeB 102 is configured to provide spatial relation information indicative of a receive (Rx) beam to be utilized by the UE 104 for downlink (DL) signal/channel reception.

In some embodiments, the gNodeB 102 is configured to provide the spatial relation information for the reception of a DL signal by configuring a TCI state as part of a scheduling/configuration signal configured to schedule/configure the DL signal. In some embodiments, the scheduling/configuration signal may comprise a physical downlink shared channel (PDSCH) scheduling signal 106 configured to schedule a transmission of a PDSCH. Alternately, in other embodiments, the scheduling/configuration signal may comprise a physical downlink control channel (PDCCH) configuration signal 108 configured to configure a transmission of a PDCCH. In some embodiments, the gNodeB 102 is configured to generate the PDSCH scheduling signal 106 configured to schedule the transmission of the PDSCH and provide the PDSCH scheduling signal 106 to the UE 104. In some embodiments, the PDSCH scheduling signal 106 comprises a TCI state indicative of a reference signal for spatial QCL relationship (i.e., in order to determine a UE receive (Rx) beam for PDSCH). In some embodiments, the PDSCH scheduling signal 106 comprises a physical downlink control channel (PDCCH). In such embodiments, a downlink control information (DCI) associated with the scheduling PDCCH (i.e., the PDSCH scheduling signal 106) comprises the TCI state. In some embodiments, the TCI state comprises a CSI-RS resource that is triggered aperiodically, i.e., an aperiodic CSI-RS. In some embodiments, the aperiodic CSI-RS is triggered by downlink control information (DCI). However, in other embodiments, the TCI state may comprise other types of reference signals, for example, periodic CSI-RS, semi-persistent CSI-RS, synchronization signal block (SSB) etc. In some embodiments, the CSI-RS resource indicated within the TCI state may comprise a CSI-RS for beam management, a CSI-RS for CSI acquisition, or a CSI-RS for tracking (TRS).

Upon receiving the PDSCH scheduling signal 106, the UE 104 is configured to process the PDSCH scheduling signal 106. Based on processing the PDSCH scheduling signal 106, in some embodiments, the UE 104 is further configured to determine a receive (Rx) beam to be utilized for the reception of the scheduled PDSCH transmission, that forms a PDSCH Rx beam, based on the indicated CSI-RS resource (included within the PDSCH scheduling signal 106). In some embodiments, the UE 104 is configured to determine the PDSCH Rx beam based on the indicated CSI-RS resource, when a scheduling offset between the PDSCH scheduling signal 106 and the scheduled transmission of the PDSCH is greater than or equal to a predefined PDSCH scheduling threshold. For embodiments where the scheduling offset between the PDSCH scheduling signal 106 and the scheduled transmission of the PDSCH is less than the predefined PDSCH scheduling threshold, the UE 104 may be configured to determine the PDSCH Rx beam to be utilized for PDSCH reception, based on a predefined default PDSCH RX beam, irrespective of indicated CSI-RS resource (included within the PDSCH scheduling signal 106). In some embodiments, default PDSCH Rx beam follows a lowest CORESET ID in the latest slot in which CORESET(s) is configured. In some embodiments, the default PDSCH Rx beam comprises a receive beam utilized for PDCCH reception.

Figure 2A:
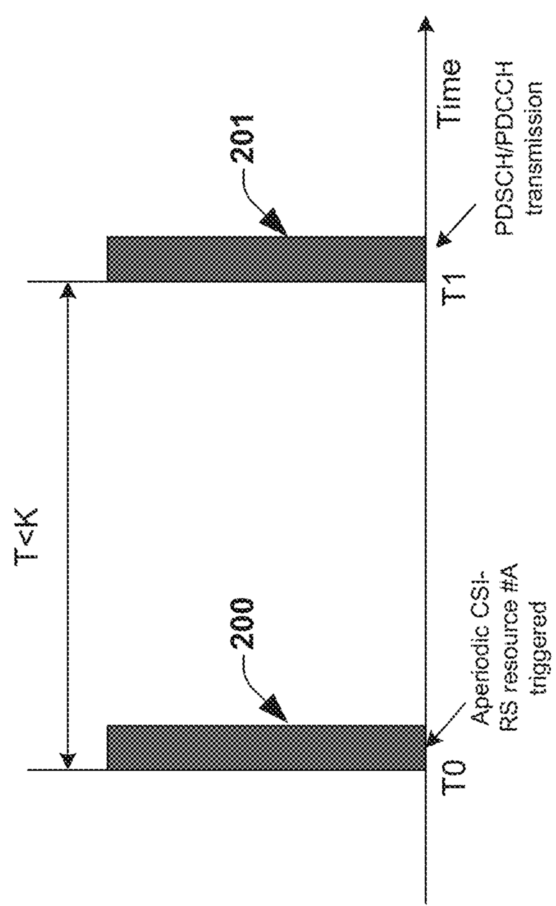
FIG. 2*a* illustrates an aperiodic channel state information reference signal (CSI-RS) resource #A (i.e., an indicated CSI-RS resource) that is transmitted at time TO which is within K slots/symbols with respect to a scheduled PDSCH transmission at time T1, according to one embodiment of the disclosure.

In a first embodiment, in order to determine the Rx beam to be utilized for the reception of the scheduled PDSCH transmission (i.e., the PDSCH Rx beam) based on the indicated CSI-RS resource that is triggered aperiodically, UE 104 is configured to determine whether the indicated CSI-RS resource (for example, CSI-RS Resource #A) is aperiodically transmitted within a predefined time period (e.g., K slots/symbols) before the scheduled PDSCH transmission. The value of K may be configured by the network or determined by the UE capability. For example, FIG. 2*a* illustrates an aperiodic CSI-RS resource #A 200 (i.e., the indicated CSI-RS resource) that is transmitted at time TO which is within K slots/symbols with respect to a scheduled PDSCH transmission 201 at time T1. If the indicated CSI-RS resource is transmitted within the predefined time period, then the UE 104 is configured to utilize a beam pattern of the aperiodic transmission of the indicated CSI-RS resource (e.g., the aperiodic CSI-RS resource #A 200 in FIG. 2*a*) as the PDSCH Rx beam.

In some embodiments, the beam pattern of the aperiodic transmission of the indicated CSI-RS resource refers to a beam pattern utilized for the reception of the aperiodic transmission of the indicated CSI-RS resource. However, when the indicated CSI-RS resource is not aperiodically transmitted within the predefined time period before the scheduled PDSCH transmission, the UE 104 may be configured to determine the PDSCH Rx beam based on an existing spatial quasi co-located (QCL) assumption for the indicated CSI-RS resource. In such embodiments, the PDSCH Rx beam follows (or comprises a beam pattern of) the existing spatial quasi co-located (QCL) assumption for the indicated CSI-RS resource. In some embodiments, the existing spatial QCL assumption for the indicated CSI-RS resource comprises information on a predefined UE Rx beam to be utilized for the indicated CSI-RS resource. In some embodiments, the existing spatial QCL assumption for the indicated CSI-RS resource is predefined and known to the UE 104. In some embodiments, information on the existing spatial QCL assumption for the indicated CSI-RS resource is provided to the UE 104 from the gNodeB 102, during the initial configuration of the indicated CSI-RS resource.

Figure 2B:
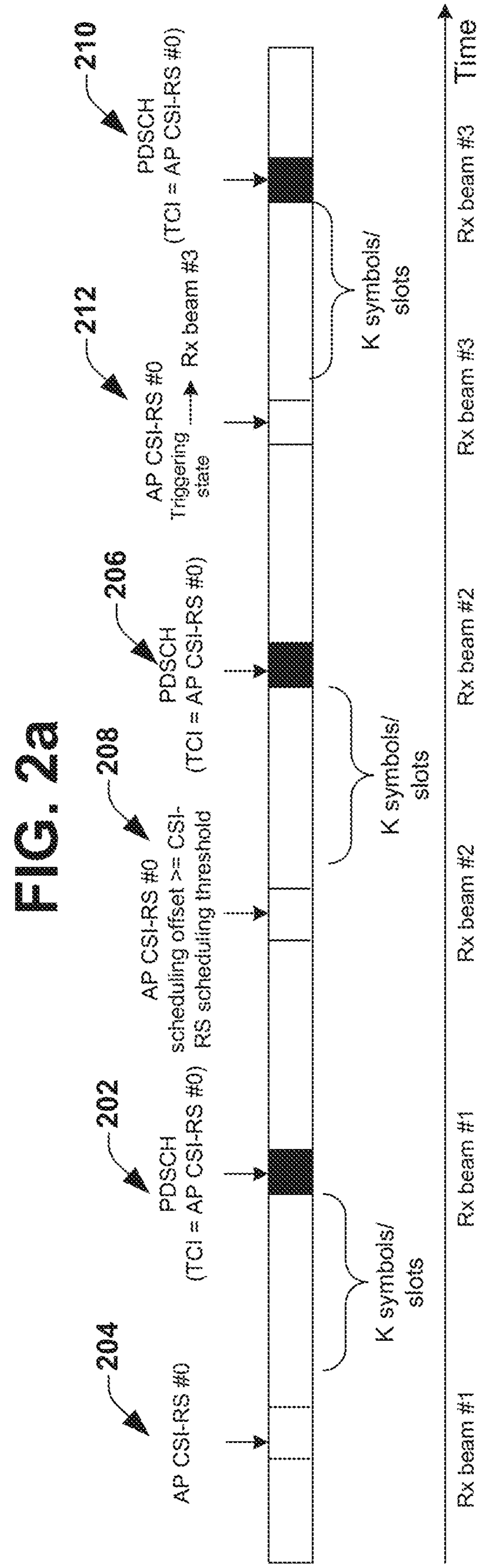
FIG. 2*b* illustrates the beam pattern of a most recent aperiodic transmission of an indicated CSI-RS resource, AP CSI-RS #0, that is transmitted before K slots/symbols before the scheduled physical downlink shared channel (PDSCH) transmission, according to the various embodiments disclosed herein.

In a second embodiment, when the indicated CSI-RS resource comprises an aperiodic CSI-RS resource, the PDSCH Rx beam determined by the UE 104 for the reception of the scheduled PDSCH transmission comprises or is quasi co-located (QCL-ed) with a beam pattern of a most recent aperiodic transmission of the indicated CSI-RS resource that is transmitted before a predefined time period (e.g., K slots/symbols) before the scheduled PDSCH transmission. The value of K may be predefined. For example, as can be seen in FIG. 2*b*, for the scheduled PDSCH 202, the PDSCH Rx beam comprises an Rx beam #1 which is same as the beam pattern of the most recent aperiodic transmission of the indicated CSI-RS resource 204, AP CSI-RS #0, that is transmitted before K slots/symbols before the scheduled PDSCH transmission 202.

In a third embodiment, when the indicated CSI-RS resource comprises an aperiodic CSI-RS resource, the PDSCH Rx beam determined by the UE 104 for the reception of the scheduled PDSCH transmission comprises or is quasi co-located (QCL-ed) with a beam pattern of a most recent aperiodic transmission of the indicated CSI-RS resource with a CSI-RS scheduling offset that is greater than or equal to a CSI-RS scheduling threshold and that is transmitted before a predefined time period before the scheduled PDSCH transmission. In some embodiments, the CSI-RS scheduling offset comprises a scheduling offset (i.e., time delay) between a downlink control information (DCI) scheduling the aperiodic CSI-RS and the actual transmission of the aperiodic CSI-RS. For example, as can be seen in FIG. 2*b*, for the scheduled PDSCH 206, the PDSCH Rx beam comprises an Rx beam #2 which is same as the beam pattern of the most recent aperiodic transmission of the indicated CSI-RS resource 208, AP CSI-RS #0 with a CSI-RS scheduling offset that is greater than or equal to a CSI-RS scheduling threshold, and that is transmitted before K slots/symbols before the scheduled PDSCH transmission 206.

In a fourth embodiment, when the indicated CSI-RS resource comprises an aperiodic CSI-RS resource, the PDSCH Rx beam determined by the UE 104 for the reception of the scheduled PDSCH transmission comprises or is quasi co-located (QCL-ed) with a beam pattern of a reference signal that is configured in a quasi co-location (QCL) information of a triggering state associated with a most recent aperiodic transmission of the indicated CSI-RS resource that is transmitted before a predefined time period before the scheduled PDSCH transmission. In some embodiments, the triggering state of a CSI-RS (e.g., a DCI configuring the CSI-RS) comprises a reference signal indicative of a beam pattern to be utilized for the CSI-RS (i.e., QCL information). For example, as can be seen in FIG. 2*b*, for the scheduled PDSCH 210, the PDSCH Rx beam comprises an Rx beam #3 which is same as the beam pattern of a reference signal that is configured in a quasi co-located (QCL) information of a triggering state associated the most recent aperiodic transmission of the indicated CSI-RS resource 212, AP CSI-RS #0, that is transmitted before K slots/symbols before the scheduled PDSCH transmission 210.

Figures 3A, 3B:
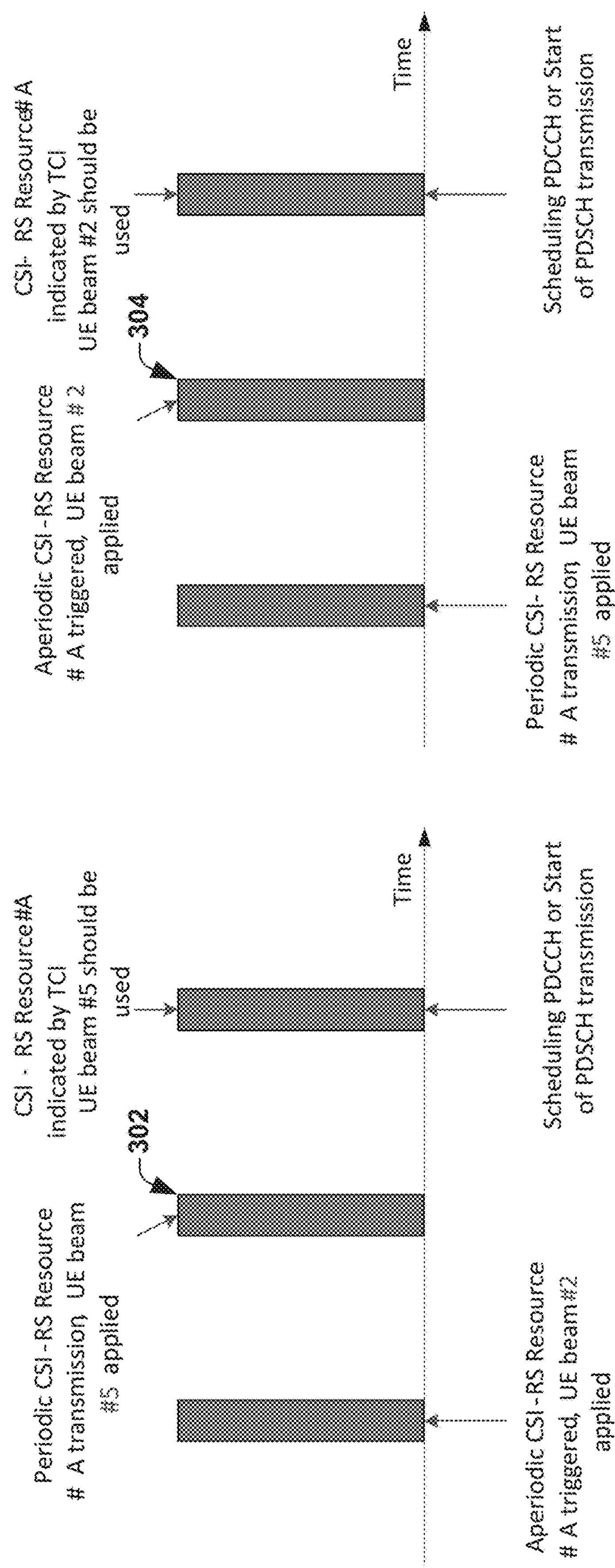
FIG. 3*a* illustrates a PDSCH/PDCCH Rx beam comprising a beam pattern of a latest periodic transmission of the indicated CSI-RS resource #A, according to one embodiment of the disclosure.
FIG. 3*b* illustrates a PDSCH/PDCCH Rx beam comprising a beam pattern of a latest aperiodic transmission of the indicated CSI-RS resource #A, according to one embodiment of the disclosure.

In a fifth embodiment, when the indicated CSI-RS resource comprises an aperiodic CSI-RS resource, the PDSCH Rx beam determined by the UE 104 for the reception of the scheduled PDSCH transmission comprises or is quasi co-located (QCL-ed) with a beam pattern of a latest transmission of the indicated CSI-RS resource, irrespective of whether the latest CSI-RS transmission is aperiodic, periodic or semi-persistent. For example, as can be seen in FIG. 3*a*, the PDSCH Rx beam comprises a UE beam #5 which is same as the beam pattern of a latest transmission of the indicated CSI-RS resource #A 302, which is a periodic transmission. Further, in FIG. 3*b*, the PDSCH Rx beam comprises a UE beam #2 which is same as the beam pattern of a latest transmission of the indicated CSI-RS resource #A 304, which is an aperiodic transmission. In some embodiments, the latest transmission of the indicated CSI-RS resource comprises a latest transmission of the indicated CSI-RS resource that has a measured signal quality that is greater than a predefined CSI-RS signal quality threshold.

For example, in some embodiments, if the latest transmission of the indicated CSI-RS resource comprises a measured signal quality that is lesser than the predefined CSI-RS signal quality threshold, the UE 104 may not use the associated beam pattern as the PDSCH Rx beam. In such embodiments, the UE 104 may be configured to use a beam pattern of a previous transmission of the indicated CSI-RS resource that has a measured signal quality that is greater than the predefined CSI-RS signal quality threshold, as the PDSCH Rx beam. In some embodiments, the UE Rx beam (or the spatial QCL assumption) for the same CSI-RS resource indicated within the TCI state may be changed at different time instances. Alternately, in other embodiments, the UE Rx beam (or the spatial QCL assumption) for the same CSI-RS resource indicated within the TCI state is kept the same within the time interval between two adjacent TCI update events.

In some embodiments, the gNodeB 102 is further configured to generate the PDCCH configuration signal 108 configured to configure the transmission of the PDCCH and provide the PDCCH configuration signal 108 to the UE 104. In some embodiments, the PDCCH configuration signal 108 comprises a TCI state indicative of a reference signal for spatial QCL relationship (i.e., to determine a UE receive (Rx) beam for PDCCH). In some embodiments, the PDCCH configuration signal 108 comprises radio resource configuration (RRC) signaling. Alternately, in other embodiments, the PDCCH configuration signal 108 comprises media access control (MAC) control element (CE). In some embodiments, the TCI state comprises a CSI-RS resource that is triggered aperiodically, i.e., an aperiodic CSI-RS. In some embodiments, the aperiodic CSI-RS is triggered by downlink control information (DCI). However, in other embodiments, the TCI state may comprise other types of reference signals, for example, periodic CSI-RS, semi-persistent CSI-RS, synchronization signal block (SSB) etc. In some embodiments, the CSI-RS resource indicated within the TCI state may comprise a CSI-RS for beam management, a CSI-RS for CSI acquisition, or a CSI-RS for tracking (TRS).

Upon receiving the PDCCH configuration signal 108, the UE 104 is configured to process the PDCCH configuration signal 108. Based on processing the PDCCH configuration signal 108, in some embodiments, the UE 104 is further configured to determine a receive (Rx) beam to be utilized for the reception of the PDCCH transmission, that forms a PDCCH Rx beam, based on the indicated CSI-RS resource (included within the PDCCH configuration signal 108). In one embodiment, when the indicated CSI-RS resource comprises an aperiodic CSI-RS resource, in order to determine the Rx beam to be utilized for the reception of the PDCCH transmission (i.e., the PDCCH Rx beam) based on the indicated CSI-RS resource, UE 104 is configured to determine whether the indicated CSI-RS resource (for example, a CSI-RS Resource #A) is aperiodically transmitted within a predefined time period (e.g., K slots/symbols) before the PDCCH transmission. The value of K may be configured by the network or determined by the UE capability. For example, FIG. 2*a* illustrates an aperiodic CSI-RS resource #A 200 (i.e., the indicated CSI-RS resource) that is transmitted at time TO which is within K slots/symbols with respect to a PDCCH transmission 201 at time T1.

If the indicated CSI-RS resource is transmitted within the predefined time period, then the UE 104 is configured to utilize a beam pattern of the aperiodic transmission of the indicated CSI-RS resource (e.g., the aperiodic CSI-RS resource #A 200 in FIG. 2*a*) as the PDCCH Rx beam. In some embodiments, the beam pattern of the aperiodic transmission of the indicated CSI-RS resource refers to a beam pattern utilized for the reception of the aperiodic transmission of the indicated CSI-RS resource. However, when the indicated CSI-RS resource is not aperiodically transmitted within the predefined time period before the PDCCH transmission, the UE 104 may be configured to determine the PDCCH Rx beam based on an existing spatial quasi co-located (QCL) assumption for the indicated CSI-RS resource. In some embodiments, the existing spatial QCL assumption for the indicated CSI-RS resource comprises information on a predefined UE Rx beam to be utilized for the reception of the indicated CSI-RS resource. In some embodiments, the existing spatial QCL assumption for the indicated CSI-RS resource is predefined and known to the UE 104. In some embodiments, information on the existing spatial QCL assumption for the indicated CSI-RS resource is provided to the UE 104 from the gNodeB 102, during the initial configuration of the indicated CSI-RS resource.

In another embodiment, when the indicated CSI-RS resource comprises an aperiodic CSI-RS resource, the PDCCH Rx beam determined by the UE 104 for the reception of the PDCCH transmission comprises or is quasi co-located (QCL-ed) with a beam pattern of a latest transmission of the indicated CSI-RS resource, irrespective of whether the latest CSI-RS transmission is aperiodic, periodic or semi-persistent. For example, as can be seen in FIG. 3*a*, the PDCCH Rx beam comprises a UE beam #5 which is same as the beam pattern of a latest transmission of the indicated CSI-RS resource #A 302, which is a periodic transmission. Further, in FIG. 3*b*, the PDCCH Rx beam comprises a UE beam #2 which is same as the beam pattern of a latest transmission of the indicated CSI-RS resource #A 304, which is an aperiodic transmission. In some embodiments, the latest transmission of the indicated CSI-RS resource comprises a latest transmission of the indicated CSI-RS resource that has a measured signal quality that is greater than a predefined CSI-RS signal quality threshold.

For example, in some embodiments, if the latest transmission of the indicated CSI-RS resource comprises a measured signal quality that is lesser than the predefined CSI-RS signal quality threshold, the UE 104 may not use the associated beam pattern as the PDCCH Rx beam. In such embodiments, the UE 104 may be configured to use a beam pattern of a previous transmission of the indicated CSI-RS resource that has a measured signal quality that is greater than the predefined CSI-RS signal quality threshold, as the PDCCH Rx beam. In some embodiments, the UE Rx beam (or the spatial QCL assumption) for the same CSI-RS resource indicated within the TCI state may be changed at different time instances. Alternately, in other embodiments, the UE Rx beam (or the spatial QCL assumption) for the same CSI-RS resource indicated within the TCI state is kept the same within the time interval between two adjacent TCI update events.

Figure 3C:
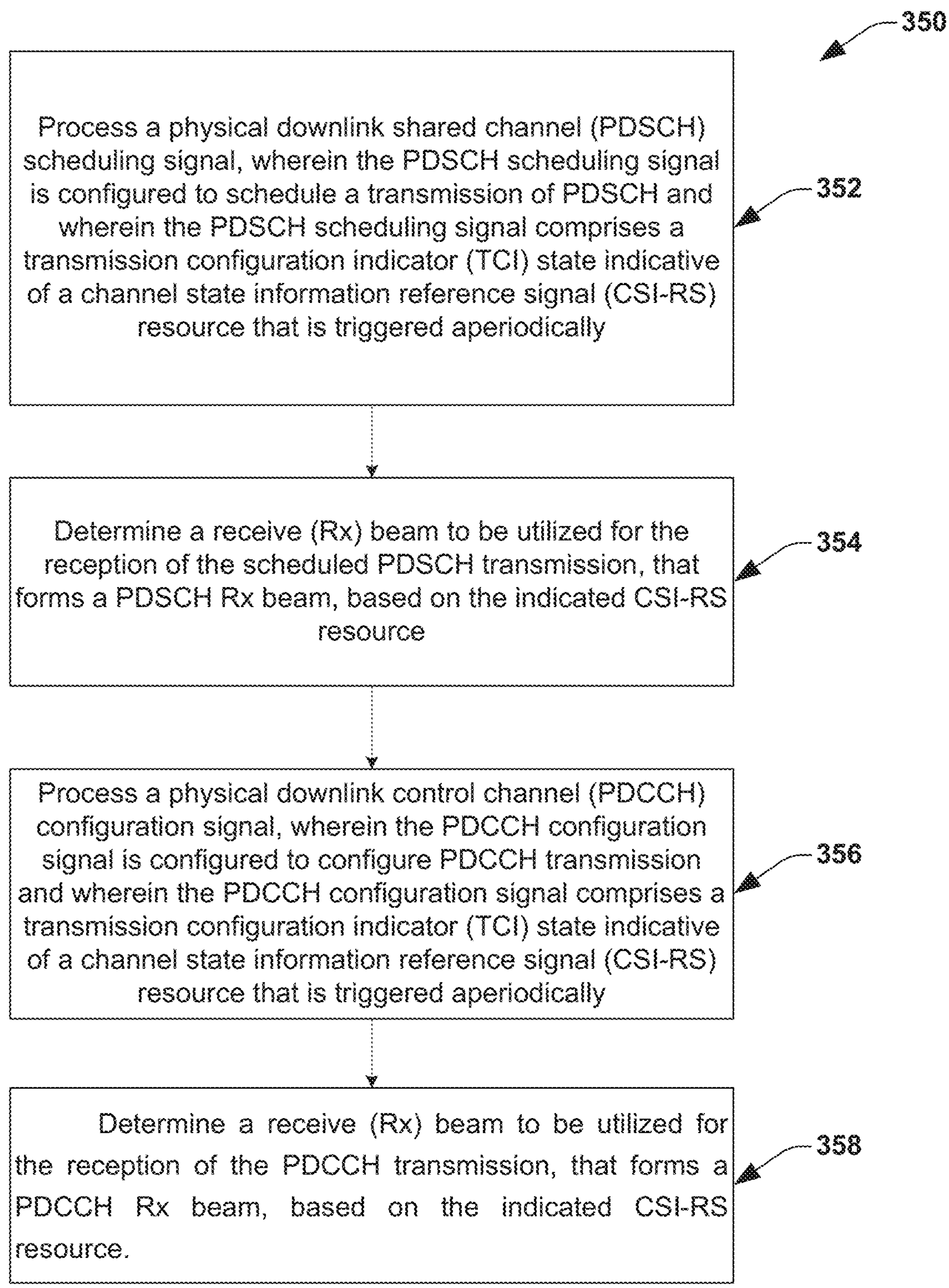
FIG. 3*c* illustrates a flow chart for a method for a user equipment (UE) that facilitates to determine spatial quasi co-location (QCL) assumption for an aperiodic channel state information reference signal (CSI-RS) indicated as part of a transmission configuration indicator (TCI) state, according to one embodiment of the disclosure.

FIG. 3*c* illustrates a flow chart for a method 350 for a user equipment (UE) that facilitates to determine spatial quasi co-location (QCL) assumption for an aperiodic channel state information reference signal (CSI-RS) indicated as part of a transmission configuration indicator (TCI) state, according to one embodiment of the disclosure. In some embodiments, the UE may comprise one or more processors (as explained below in FIG. 5) configured to perform one or more operations associated with the method 350. In some embodiments, the method 350 is applicable to the UE 104 in FIG. 1. Therefore, the method 350 is explained herein with reference to the UE 104 in FIG. 1. However, in other embodiments, the method 350 may be applied to other UEs as well associated with new radio (NR) systems. At 352, a physical downlink shared channel (PDSCH) scheduling signal, received from a gNodeB (e.g., the gNodeB 102 in FIG. 1) associated therewith, is processed at a UE (e.g., the UE 104 in FIG. 1). In some embodiments, the PDSCH scheduling signal is configured to schedule a transmission of PDSCH and the PDSCH scheduling signal comprises a transmission configuration indicator (TCI) state indicative of a channel state information reference signal (CSI-RS) resource that is triggered aperiodically.

At 354, a receive (Rx) beam to be utilized for the reception of the scheduled PDSCH transmission, that forms a PDSCH Rx beam, is determined at the UE, based on the indicated CSI-RS resource. In some embodiments, the PDSCH Rx beam is determined based on the indicated CSI-RS resource, in accordance with any of the embodiments described above with respect to FIG. 1. At 356, a physical downlink control channel (PDCCH) configuration signal received from the gNodeB associated therewith, is processed at the UE. In some embodiments, the PDCCH configuration signal is configured to configure PDCCH transmission and the PDCCH configuration signal comprises a transmission configuration indicator (TCI) state indicative of a channel state information reference signal (CSI-RS) resource that is triggered aperiodically. At 358, a receive (Rx) beam to be utilized for the reception of the PDCCH transmission, that forms a PDCCH Rx beam, is determined at the UE, based on the indicated CSI-RS resource. In some embodiments, the PDCCH Rx beam is determined based on the indicated CSI-RS resource, in accordance with any of the embodiments described above with respect to FIG. 1.

Figure 4:
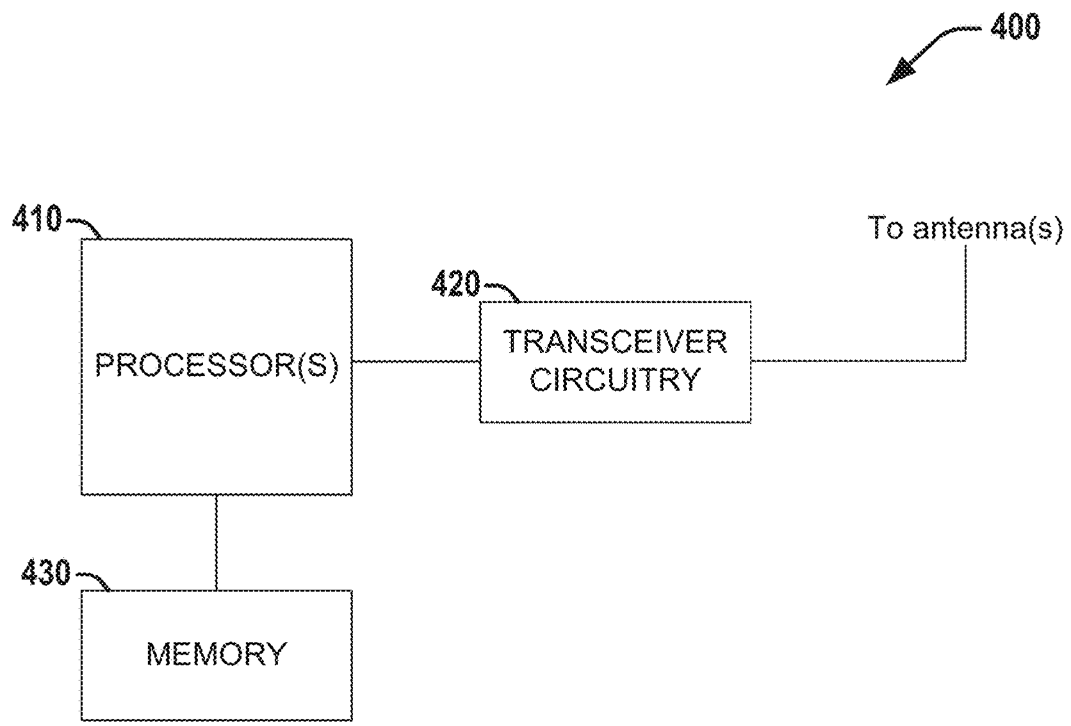
FIG. 4 illustrates a block diagram of an apparatus employable at a Base Station (BS), eNodeB, gNodeB or other network device that facilitates to determine spatial quasi co-location (QCL) assumption for an aperiodic channel state information reference signal (CSI-RS) indicated as part of a transmission configuration indicator (TCI) state, according to various aspects described herein.

Referring to FIG. 4, illustrated is a block diagram of an apparatus 400 employable at a Base Station (BS), eNodeB, gNodeB or other network device that facilitates to determine spatial quasi co-location (QCL) assumption for an aperiodic channel state information reference signal (CSI-RS) indicated as part of a transmission configuration indicator (TCI) state, according to various aspects described herein. The apparatus 400 can include one or more processors 410 comprising processing circuitry and associated interface(s) (e.g., a radio frequency interface), communication circuitry 420, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 430 (which can comprise any of a variety of storage mediums and can store instructions and/or data associated with one or more of processor(s) 410 or communication circuitry 420). In various aspects, the apparatus 400 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 410, communication circuitry 420, and the memory 430 can be included in a single device, while in other aspects, they can be included in different devices, such as part of a distributed architecture. In some embodiments, the apparatus 400 could be included within the gNodeB 102 of FIG. 1.

Figure 5:
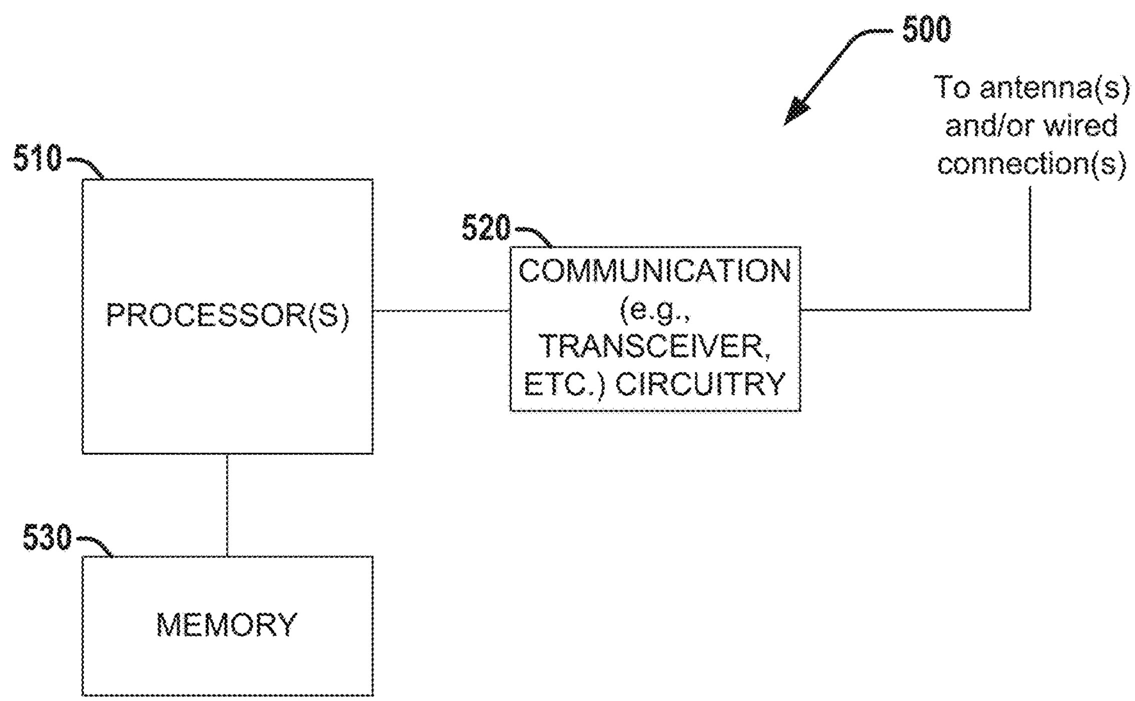
FIG. 5 illustrates a block diagram of an apparatus employable at a user equipment (UE) or other network device (e.g., IoT device) that is configured to determine spatial quasi co-location (QCL) assumption for an aperiodic channel state information reference signal (CSI-RS) indicated as part of a transmission configuration indicator (TCI) state, according to various aspects described herein.

Referring to FIG. 5, illustrated is a block diagram of an apparatus 500 employable at a user equipment (UE) or other network device (e.g., IoT device) that is configured to determine spatial quasi co-location (QCL) assumption for an aperiodic channel state information reference signal (CSI-RS) indicated as part of a transmission configuration indicator (TCI) state, according to various aspects described herein. Apparatus 500 can include one or more processors 510 comprising processing circuitry and associated interface(s) (e.g., radio frequency interface), transceiver circuitry 520 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 530 (which can comprise any of a variety of storage mediums and can store instructions and/or data associated with one or more of processor(s) 510 or transceiver circuitry 520). In various aspects, apparatus 500 can be included within a user equipment (UE).

In various aspects discussed herein, signals and/or messages can be generated and output for transmission, and/or transmitted messages can be received and processed. Depending on the type of signal or message generated, outputting for transmission (e.g., by processor(s) 510) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 510) can comprise one or more of: identifying physical resources associated with the signal/message, detecting the signal/message, resource element group deinterleaving, demodulation, descrambling, and/or decoding. In some embodiments, the apparatus 500 could be included within the UE 104 of FIG. 1.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus configured to be employed in a user equipment (UE) associated with a new radio (NR) system, comprising one or more processors configured to process a physical downlink shared channel (PDSCH) scheduling signal, received from a gNodeB associated therewith, wherein the PDSCH scheduling signal is configured to schedule a transmission of PDSCH and wherein the PDSCH scheduling signal comprises a transmission configuration indicator (TCI) state indicative of a channel state information reference signal (CSI-RS) resource that is triggered aperiodically; and determine a receive (Rx) beam to be utilized for the reception of the scheduled PDSCH transmission, that forms a PDSCH Rx beam, based on the indicated CSI-RS resource.

Example 2 is an apparatus, including the subject matter of example 1, wherein the one or more processors is configured to determine the PDSCH Rx beam based on the indicated CSI-RS resource, when a scheduling offset between the PDSCH scheduling signal and the scheduled transmission of the PDSCH is greater than or equal to a predefined PDSCH scheduling threshold.

Example 3 is an apparatus, including the subject matter of examples 1-2, including or omitting elements, wherein, when the scheduling offset between the PDSCH scheduling signal and the scheduled transmission of the PDSCH is less than the predefined PDSCH scheduling threshold, the one or more processors is configured to determine the PDSCH Rx beam based on a predefined default PDSCH RX beam, irrespective of indicated CSI-RS resource.

Example 4 is an apparatus, including the subject matter of examples 1-3, including or omitting elements, wherein determining the PDSCH Rx beam comprises determining whether the indicated CSI-RS resource is aperiodically transmitted within a predefined time period before the scheduled PDSCH transmission and utilizing a beam pattern of the aperiodic transmission of the indicated CSI-RS resource within the predefined timeperiod as the PDSCH Rx beam, when the indicated CSI-RS resource is aperiodically transmitted within the predefined time period before the scheduled PDSCH transmission.

Example 5 is an apparatus, including the subject matter of examples 1-4, including or omitting elements, wherein, when the indicated CSI-RS resource is not aperiodically transmitted within the predefined time period before the scheduled PDSCH transmission, the PDSCH Rx beam follows an existing spatial quasi co-located (QCL) assumption for the indicated CSI-RS resource.

Example 6 is an apparatus, including the subject matter of examples 1-5, including or omitting elements, wherein the PDSCH Rx beam comprises a beam pattern of a most recent aperiodic transmission of the indicated CSI-RS resource that is transmitted before a predefined time period before the scheduled PDSCH transmission.

Example 7 is an apparatus, including the subject matter of examples 1-6, including or omitting elements, wherein the PDSCH Rx beam comprises a beam pattern of a most recent aperiodic transmission of the indicated CSI-RS resource with a CSI-RS scheduling offset that is greater than or equal to a CSI-RS scheduling threshold and that is transmitted before a predefined time period before the scheduled PDSCH transmission.

Example 8 is an apparatus, including the subject matter of examples 1-7, including or omitting elements, wherein the PDSCH Rx beam comprises a beam pattern of a reference signal that is configured in a quasi co-location (QCL) information of a triggering state associated with a most recent aperiodic transmission of the indicated CSI-RS resource that is transmitted before a predefined time period before the scheduled PDSCH transmission.

Example 9 is an apparatus, including the subject matter of examples 1-8, including or omitting elements, wherein the PDSCH Rx beam comprises a beam pattern of a latest transmission of the indicated CSI-RS resource, irrespective of whether the latest CSI-RS transmission is aperiodic, periodic or semi-persistent.

Example 10 is an apparatus, including the subject matter of examples 1-9, including or omitting elements, wherein the latest transmission of the indicated CSI-RS resource comprises a latest transmission of the indicated CSI-RS resource that has a measured signal quality that is greater than a predefined CSI-RS signal quality threshold.

Example 11 is an apparatus, including the subject matter of examples 1-10, including or omitting elements, wherein the one or more processors is further configured to process a physical downlink control channel (PDCCH) configuration signal received from the gNodeB associated therewith, wherein the PDCCH configuration signal is configured to configure PDCCH transmission and wherein the PDCCH configuration signal comprises a transmission configuration indicator (TCI) state indicative of a channel state information reference signal (CSI-RS) resource that is triggered aperiodically; and determine a receive (Rx) beam to be utilized for the reception of the PDCCH transmission, that forms a PDCCH Rx beam, based on the indicated CSI-RS resource.

Example 12 is an apparatus, including the subject matter of examples 1-11, including or omitting elements, wherein determining the PDCCH Rx beam comprises determining whether the indicated CSI-RS resource is aperiodically transmitted within a predefined time period before the PDCCH transmission and utilizing a beam pattern of the aperiodic transmission of the indicated CSI-RS as the PDCCH Rx beam, when the indicated CSI-RS resource is aperiodically transmitted within the predefined time period before the PDCCH transmission.

Example 13 is an apparatus, including the subject matter of examples 1-12, including or omitting elements, wherein, when the indicated CSI-RS resource is not aperiodically transmitted within the predefined time period before the PDCCH transmission, the PDCCH Rx beam follows an existing spatial quasi co-located (QCL) assumption for the indicated CSI-RS resource.

Example 14 is an apparatus, including the subject matter of examples 1-13, including or omitting elements, wherein the PDSCH scheduling signal comprises a physical downlink control channel (PDCCH).

Example 15 is an apparatus, including the subject matter of examples 1-14, including or omitting elements, wherein the PDCCH configuration signal comprises medium access control (MAC) layer signaling.

Example 16 is a method for an apparatus configured to be employed in a user equipment (UE) associated with a new radio (NR) system, the method comprising processing a physical downlink shared channel (PDSCH) scheduling signal, received from a gNodeB associated therewith, at one or more processors associated with the UE, wherein the PDSCH scheduling signal is configured to schedule a transmission of PDSCH and wherein the PDSCH scheduling signal comprises a transmission configuration indicator (TCI) state indicative of a channel state information reference signal (CSI-RS) resource that is triggered aperiodically; and determining, at the one or more processors, a receive (Rx) beam to be utilized for the reception of the scheduled PDSCH transmission, that forms a PDSCH Rx beam, based on the indicated CSI-RS resource, when a scheduling offset between the PDSCH scheduling signal and the scheduled transmission of the PDSCH is greater than or equal to a predefined PDSCH scheduling threshold.

Example 17 is a method, including the subject matter of example 16, further comprising determining, at the one or more processors, the PDSCH Rx beam based on a predefined default PDSCH RX beam, irrespective of indicated CSI-RS resource, when the scheduling offset between the PDSCH scheduling signal and the scheduled transmission of the PDSCH is less than the predefined PDSCH scheduling threshold.

Example 18 is a method, including the subject matter of examples 16-17, including or omitting elements, wherein determining the PDSCH Rx beam comprises determining whether the indicated CSI-RS resource is aperiodically transmitted within a predefined time period before the scheduled PDSCH transmission and utilizing a beam pattern of the aperiodic transmission of the indicated CSI-RS as the PDSCH Rx beam, when the indicated CSI-RS resource is aperiodically transmitted within the predefined time period before the scheduled PDSCH transmission.

Example 19 is a method, including the subject matter of examples 16-18, including or omitting elements, wherein, when the indicated CSI-RS resource is not aperiodically transmitted within the predefined time period before the scheduled PDSCH transmission, the PDSCH Rx beam follows an existing spatial quasi co-located (QCL) assumption for the indicated CSI-RS resource.

Example 20 is a method, including the subject matter of examples 16-19, including or omitting elements, wherein the PDSCH Rx beam comprises a beam pattern of a most recent aperiodic transmission of the indicated CSI-RS resource that is transmitted before a predefined time period before the scheduled PDSCH transmission.

Example 21 is a method, including the subject matter of examples 16-20, including or omitting elements, wherein the PDSCH Rx beam comprises a beam pattern of a most recent aperiodic transmission of the indicated CSI-RS resource with a CSI-RS scheduling offset that is greater than or equal to a CSI-RS scheduling threshold and that is transmitted before a predefined time period before the scheduled PDSCH transmission.

Example 22 is a method, including the subject matter of examples 16-21, including or omitting elements, wherein the PDSCH Rx beam comprises a beam pattern of a reference signal that is configured in a quasi co-location (QCL) information of a triggering state associated with a most recent aperiodic transmission of the indicated CSI-RS resource that is transmitted before a predefined time period before the scheduled PDSCH transmission.

Example 23 is a method, including the subject matter of examples 16-22, including or omitting elements, wherein the PDSCH Rx beam comprises a beam pattern of a latest transmission of the indicated CSI-RS resource, irrespective of whether the latest CSI-RS transmission is aperiodic, periodic or semi-persistent.

Example 24 is a computer readable storage device storing executable instructions that, in response to execution, cause one or more processors of a user equipment (UE) to perform operations, the operations comprising processing a physical downlink shared channel (PDSCH) scheduling signal, received from a gNodeB associated therewith, wherein the PDSCH scheduling signal is configured to schedule a transmission of PDSCH and wherein the PDSCH scheduling signal comprises a transmission configuration indicator (TCI) state indicative of a channel state information reference signal (CSI-RS) resource that is triggered aperiodically; and determining a receive (Rx) beam to be utilized for the reception of the scheduled PDSCH transmission, that forms a PDSCH Rx beam, based on the indicated CSI-RS resource, when a scheduling offset between the PDSCH scheduling signal and the scheduled transmission of the PDSCH is greater than or equal to a predefined PDSCH scheduling threshold.

Example 25 is a computer readable storage device, including the subject matter of example 24, wherein the operations further comprises determining the PDSCH Rx beam based on a predefined default PDSCH RX beam, irrespective of indicated CSI-RS resource, when the scheduling offset between the PDSCH scheduling signal and the scheduled transmission of the PDSCH is less than the predefined PDSCH scheduling threshold.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

What is claimed is:

1. A user equipment (UE), comprising:

one or more processors configured to:

process a physical downlink shared channel (PDSCH) scheduling signal, received from a base station (BS), wherein the PDSCH scheduling signal is configured to schedule a PDSCH transmission and wherein the PDSCH scheduling signal comprises a first transmission configuration indicator (TCI) state indicative of a first channel state information reference signal (CSI-RS) resource;

determine a PDSCH receive (Rx) beam to be utilized for a reception of the PDSCH transmission based on the first CSI-RS resource based at least in part on whether the first CSI-RS resource is aperiodically transmitted within a predefined time period before the scheduled PDSCH transmission; and generate a beam pattern of an aperiodic transmission of the first CSI-RS resource within the predefined time period as the PDSCH Rx beam, in response to the first CSI-RS resource being aperiodically transmitted within the predefined time period before the scheduled PDSCH transmission.

2. The UE of claim 1, wherein the one or more processors is configured to determine the PDSCH Rx beam based on the first CSI-RS resource, when a scheduling offset between the PDSCH scheduling signal and the scheduled PDSCH transmission is greater than or equal to a predefined PDSCH scheduling threshold, wherein the predefined time period comprises a plurality of symbols/slots.

3. The UE of claim 2, wherein, when the scheduling offset between the PDSCH scheduling signal and the PDSCH transmission is less than the predefined PDSCH scheduling threshold, the one or more processors is configured to determine the PDSCH Rx beam based on a predefined default PDSCH RX beam, irrespective of the first CSI-RS resource.

4. The UE of claim 1, wherein, when the first CSI-RS resource is not aperiodically transmitted within the predefined time period before the PDSCH transmission, the PDSCH Rx beam follows an existing spatial quasi co-located (QCL) assumption for the first CSI-RS resource.

5. The UE of claim 1, wherein the PDSCH Rx beam comprises a beam pattern of a most recent aperiodic transmission of the first CSI-RS resource that is transmitted before a predefined time period before the PDSCH transmission.

6. The UE of claim 1, wherein the PDSCH Rx beam comprises a beam pattern of a most recent aperiodic transmission of the first CSI-RS resource with a CSI-RS scheduling offset that is greater than or equal to a CSI-RS scheduling threshold and that is transmitted before a predefined time period before the PDSCH transmission.

7. The UE of claim 1, wherein the PDSCH Rx beam comprises a beam pattern of a reference signal that is configured in a quasi co-location (QCL) information of a triggering state associated with a most recent aperiodic transmission of the first CSI-RS resource that is transmitted before a predefined time period before the PDSCH transmission.

8. The UE of claim 1, wherein the PDSCH Rx beam comprises a beam pattern of a latest transmission of the first CSI-RS resource, irrespective of whether the latest transmission of the first CSI-RS resource is aperiodic, periodic or semi-persistent.

9. The UE of claim 8, wherein the latest transmission of the first CSI-RS resource comprises the latest transmission of the first CSI-RS resource that has a measured signal quality that is greater than a predefined CSI-RS signal quality threshold.

10. The UE of claim 1, wherein the one or more processors is further configured to process a physical downlink control channel (PDCCH) configuration signal received from the BS associated therewith, wherein the PDCCH configuration signal is configured to configure PDCCH transmission and wherein the PDCCH configuration signal comprises a second transmission configuration indicator (TCI) state indicative of a second channel state information reference signal (CSI-RS) resource that is triggered aperiodically; and determine a receive (Rx) beam to be utilized for a reception of the PDCCH transmission, that forms a PDCCH Rx beam, based on the second CSI-RS resource.

11. The UE of claim 10, wherein determining the PDCCH Rx beam comprises determining whether the second CSI-RS resource is aperiodically transmitted within a predefined time period before the PDCCH transmission and utilizing a beam pattern of an aperiodic transmission of the second CSI-RS resource within the predefined time period as the PDCCH Rx beam, when the second CSI-RS resource is aperiodically transmitted within the predefined time period before the PDCCH transmission.

12. The UE of claim 11, wherein, when the second CSI-RS resource is not aperiodically transmitted within the predefined time period before the PDCCH transmission, the PDCCH Rx beam follows an existing spatial quasi co-located (QCL) assumption for the second CSI-RS resource.

13. The UE of claim 1, wherein the PDSCH scheduling signal comprises a physical downlink control channel (PDCCH).

14. The UE of claim 10, wherein the PDCCH configuration signal comprises medium access control (MAC) layer signaling.

15. A method for a user equipment (UE), the method comprising:

processing a physical downlink shared channel (PDSCH) scheduling signal, received from a base station (BS), at one or more processors associated with the UE, wherein the PDSCH scheduling signal is configured to schedule a PDSCH transmission and wherein the PDSCH scheduling signal comprises a transmission configuration indicator (TCI) state indicative of a channel state information reference signal (CSI-RS) resource;

determining, at the one or more processors, a PDSCH receive (Rx) beam to be utilized for a reception of the PDSCH transmission based on the CSI-RS resource based at least in part on whether the CSI-RS resource is aperiodically transmitted within a predefined time period comprising a plurality of symbols / slots before the PDSCH transmission; and generating a beam pattern of an aperiodic transmission of the CSI-RS resource within the predefined time period as the PDSCH Rx beam, in response to the CSI-RS resource being aperiodically transmitted within the predefined time period before the PDSCH transmission.

16. The method of claim 15, further comprising determining, at the one or more processors, the PDSCH Rx beam based on a predefined default PDSCH RX beam, irrespective of the CSI-RS resource, when a scheduling offset between the PDSCH scheduling signal and the PDSCH transmission is less than a predefined PDSCH scheduling threshold.

17. A baseband processor configured to:

process a physical downlink shared channel (PDSCH) scheduling signal, received from a base station (BS) associated therewith, wherein the PDSCH scheduling signal is configured to schedule a PDSCH transmission and wherein the PDSCH scheduling signal comprises a transmission configuration indicator (TCI) state indicative of a channel state information reference signal (CSI-RS) resource;

determine a PDSCH receive (Rx) beam to be utilized for a reception of the scheduled PDSCH transmission based on the CSI-RS resource, when a scheduling offset between the PDSCH scheduling signal and the PDSCH transmission is greater than or equal to a predefined PDSCH scheduling threshold based at least in part on whether the CSI-RS resource is aperiodically transmitted within a predefined time period comprising a plurality of symbols/slots before the scheduled PDSCH transmission; and generate a beam pattern of an aperiodic transmission of the CSI-RS resource within the predefined time period as the PDSCH Rx beam, in response to the CSI-RS resource being aperiodically transmitted within the predefined time period before the scheduled PDSCH transmission.

18. The baseband processor of claim 17, further configured to determine the PDSCH Rx beam based on a predefined default PDSCH RX beam, irrespective of the CSI-RS resource, when the scheduling offset between the PDSCH scheduling signal and the PDSCH transmission is less than the predefined PDSCH scheduling threshold.

* * * * *